(12) United States Patent
Wang et al.

(10) Patent No.: US 10,009,204 B2
(45) Date of Patent: Jun. 26, 2018

(54) RANDOM ACCESS PREAMBLE SIGNAL CONSTRUCTION

(71) Applicant: Telefonaktiebolaget L M Ericsson (publ), Stockholm (SE)

(72) Inventors: Jianfeng Wang, Beijing (CN); Zhiheng Guo, Beijing (CN); Henrik Sahlin, Mölnlycke (SE); Huaisong Zhu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 14/773,914

(22) PCT Filed: May 27, 2015

(86) PCT No.: PCT/CN2015/079939
§ 371 (c)(1),
(2) Date: Sep. 9, 2015

(87) PCT Pub. No.: WO2016/187844
PCT Pub. Date: Dec. 1, 2016

(65) Prior Publication Data
US 2016/0353479 A1   Dec. 1, 2016

(51) Int. Cl.
*H04L 27/26* (2006.01)
*H04W 74/00* (2009.01)

(52) U.S. Cl.
CPC ...... *H04L 27/2613* (2013.01); *H04L 27/2607* (2013.01); *H04W 74/004* (2013.01)

(58) Field of Classification Search
None
See application file for complete search history.

(56) References Cited

U.S. PATENT DOCUMENTS

2004/0252777 A1* 12/2004 Suh .............. H04J 11/003
375/260
2007/0153758 A1* 7/2007 Kang .............. H04B 7/2606
370/338
(Continued)

FOREIGN PATENT DOCUMENTS

CN   102111895 A   6/2011
CN   103384407 A   11/2013
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.2.1, Jun. 2014, pp. 1-57.

(Continued)

*Primary Examiner* — Brandon M Renner
(74) *Attorney, Agent, or Firm* — Murphy, Bilak & Homiller, PLLC (57) ABSTRACT

A node and an access node and methods therein for handling random access is disclosed. A method in a node for random access in a wireless network comprises, determining a set of sub-carrier shifts, wherein each sub-carrier shift indicates a shift with respect to a starting position in frequency domain for transmitting a random access preamble. The method further comprises selecting a sub-carrier shift from the set of sub-carrier shifts. The method further comprises transmitting a random access preamble to an access node, wherein the random access preamble is transmitted according to the selected sub-carrier shift.

34 Claims, 6 Drawing Sheets

(56) References Cited

U.S. PATENT DOCUMENTS

| | | | |
|---|---|---|---|
| 2008/0260085 A1* | 10/2008 | Lin | H04L 27/2659 375/362 |
| 2009/0181687 A1* | 7/2009 | Tiirola | H04L 27/2613 455/450 |
| 2009/0268666 A1* | 10/2009 | Vujcic | H04W 74/0866 370/328 |
| 2011/0007825 A1* | 1/2011 | Hao | H04J 13/0062 375/259 |
| 2011/0019694 A1 | 1/2011 | Kwon et al. | |
| 2011/0064032 A1* | 3/2011 | Sun | H04L 5/0007 370/328 |
| 2011/0098074 A1* | 4/2011 | Seo | H04L 5/0007 455/509 |
| 2011/0103328 A1 | 5/2011 | Lee et al. | |
| 2011/0243108 A1* | 10/2011 | Park | H04W 48/16 370/336 |
| 2012/0294233 A1* | 11/2012 | Radunovic | H04L 27/0006 370/328 |
| 2016/0112168 A1* | 4/2016 | Yoo | H04L 5/0048 370/280 |

FOREIGN PATENT DOCUMENTS

| | | |
|---|---|---|
| WO | 2007149290 A2 | 12/2007 |
| WO | 2015144208 A1 | 10/2015 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, pp. 1-108.

* cited by examiner

RANDOM ACCESS PREAMBLE SIGNAL CONSTRUCTION

TECHNICAL FIELD

Embodiments herein relate to random access. In particular, methods for random access and a node and an access node implementing the methods are disclosed

BACKGROUND

One of the most basic requirements for any cellular system is the possibility for a node to initially request a connection setup, commonly referred to as random access. In LTE, the random access procedure comes in two forms, allowing access to be either contention-based or contention-free. The contention-based procedure as initiated by a node consists of four-steps, 1) Preamble transmission, 2) Random access response, 3) Layer 2/Layer 3 message transmission; 4) Contention resolution message.

In LTE random access preambles in step 1) are generated from cyclic shifts of one or several root Zadoff-Chu (ZC) sequence. Basically there are a number of available random access preambles for the node to select to do the random access in one cell. E.g. in an LTE system, there are 64 random access preambles that can be used for random access in each cell. Each time when the node is about to do the random access, one random access preamble out of the 64 random access preambles is selected. A collision will occur if several nodes are selecting the same random access preamble which could result in random access failure for some or all nodes. It is therefore important that the multiple nodes are configured to choose the same random access preamble with a low probability. The larger the number of different random access preambles that are available, the smaller the probability of random access failure due to collision.

In LTE, once a random access preamble is detected, the access node would send a Random Access Response (RAR) on the Physical Downlink Shared Channel, PDSCH, in step 2), and address the node with a Random Access Radio Network Temporary Identifier (RA-LNTI), which conveys the identity of the detected random access preamble, a timing alignment instruction to synchronize subsequent uplink transmission from the node, an initial uplink resource grant for transmission of the Step 3 message, and an assignment of a temporary Cell Radio Network Temporary Identifier (C-RNTI).

In Step 3, the node would convey the random access procedure message, such as an RRC connection request, tracking area update, or scheduling request. Finally, in the following Step 4, the contention resolution message would be sent by access node.

To work against phase noise and frequency error for higher carrier frequencies and reduce the hardware complexity for multiple antennas, a new random access preamble is proposed. The proposed random access preamble is constructed by repeating a short sequence multiple times and a corresponding random access preamble detector reusing the FFTs for other uplink channels and signals. In this way, the amount of special random-access related processing and hardware support is significantly reduced for multi-antenna systems, and the detector is also robust against inter-carrier interference from other uplink channels and signals. Furthermore, the proposed random access preamble detector scheme can be used in scenarios with a high amount of phase noise and frequency errors.

From a frequency point of view, the random access preamble would occupy a number of RB (Resource Blocks) or equivalently a number of sub-carriers. Here the length of the frequency allocation should be a prime number in order to use Zadoff-Chu sequences which are known to have good auto- and cross-correlation properties. This prime number must be less than, or equal to, the number of allocated sub-carriers.

For example, a random access allocation similar to the one used in LTE might be used where the preamble occupies six RBs, where each RB contains twelve sub-carriers. The sub-carriers index for the six RBs could be m, m+1, . . . , m+71, where m is the starting position or starting sub-carrier index for the six RBs.

In general, the number of available random access preambles can be increased by increasing the frequency allocation a random access channel on the basis that a larger frequency allocation allows for longer root sequences to be used.

However, the number of available random access preambles only increases linearly with the number of allocated sub-carriers.

SUMMARY

Thus, an objective is to solve, or at least mitigates, the above mentioned problem with a small number of available orthogonal preamble sequences.

A random access preamble generation is therefore proposed which is based on frequency shifts of root sequences and/or sub-carrier shifts of random access preambles, such that a number of available random access preambles are increased.

According to a first aspect, a method for a node 120 for random access in a wireless network is disclosed. The method comprises determining 302 a set of sub-carrier shifts, wherein each sub-carrier shift indicates a shift with respect to a starting position in frequency domain for transmitting a random access preamble. The method further comprises selecting 303 a sub-carrier shift from the set of sub-carrier shifts. The method further comprises transmitting 304 a random access preamble to an access node 110, wherein the random access preamble is transmitted according to the selected sub-carrier shift.

According to a second aspect, a method for an access node 110 for random access in a wireless network is disclosed. The method comprises determining 402 a set of sub-carrier shifts, wherein each sub-carrier shift indicates a shift with respect to a starting position in frequency domain for receiving a random access preamble. The method further comprises receiving 403 a random access preamble from a node 120. The method further comprises detecting 404 a selected sub-carrier shift of the random access preamble out of the set of sub-carrier shifts.

According to a third aspect a node 120 for random access in a wireless network is disclosed. The node 120 comprises means 502, 508 for determining a set of sub-carrier shifts, wherein each sub-carrier shift indicates a shift with respect to a starting position in frequency domain for transmitting a random access preamble. The node 120 further comprises means 502, 509 for selecting a sub-carrier shift from the set of possible sub-carrier shifts. The node 120 further comprises means 501, 510 for transmitting a random access preamble to an access node 110, wherein the random access preamble is transmitted according to the selected sub-carrier shift.

According to a fourth aspect an access node 110 for random access in a wireless network is disclosed. The access node 110 comprises means 602, 608 for determining a set of sub-carrier shifts, wherein each sub-carrier shift indicates a shift with respect to a starting position in frequency domain for receiving a random access preamble. The access node 110 further comprises means 601, 611 for receiving a random access preamble from a node 120. The access node 110 further comprises means 602, 609 for detecting a selected sub-carrier shift of the random access preamble out of the set of sub-carrier shifts.

One of the embodiments disclosed here in is that the number of preambles for random access in a cell is increased. In one example the number of preambles is at least doubled if two sets of sub-carrier mappings with a respective sub-carrier shift are applied. If n sub-carrier shifts are applied, the random access preambles will be n times increased. Thus the number of random access preambles is increased much more than a linear increase in the number of used sub-carriers.

Another advantage is that the random access success rate will be improved due to more available random access preambles.

Another advantage is that the node implementation complexity is low due to easy implementation of a shifting subcarrier.

BRIEF DESCRIPTION OF THE DRAWINGS

Exemplary embodiments are now described, by way of example, with reference to the accompanying drawings, in which.

DETAILED DESCRIPTION

Throughout the following description similar reference numerals have been used to denote similar features, such as actions, steps, nodes, elements, units, modules, circuits, parts, items or the like, when applicable. In the Figures, features that appear in some embodiments are indicated by dashed lines.

Embodiments presented herein relate to several aspects of increasing the number of available random access preambles for use in a wireless network.

Using the proposed random access preamble as describe above in the background section the number of orthogonal random access preambles constructed from time domain cyclic shifts of a root sequence would be very small even within a very small cell coverage.

Figure 1:
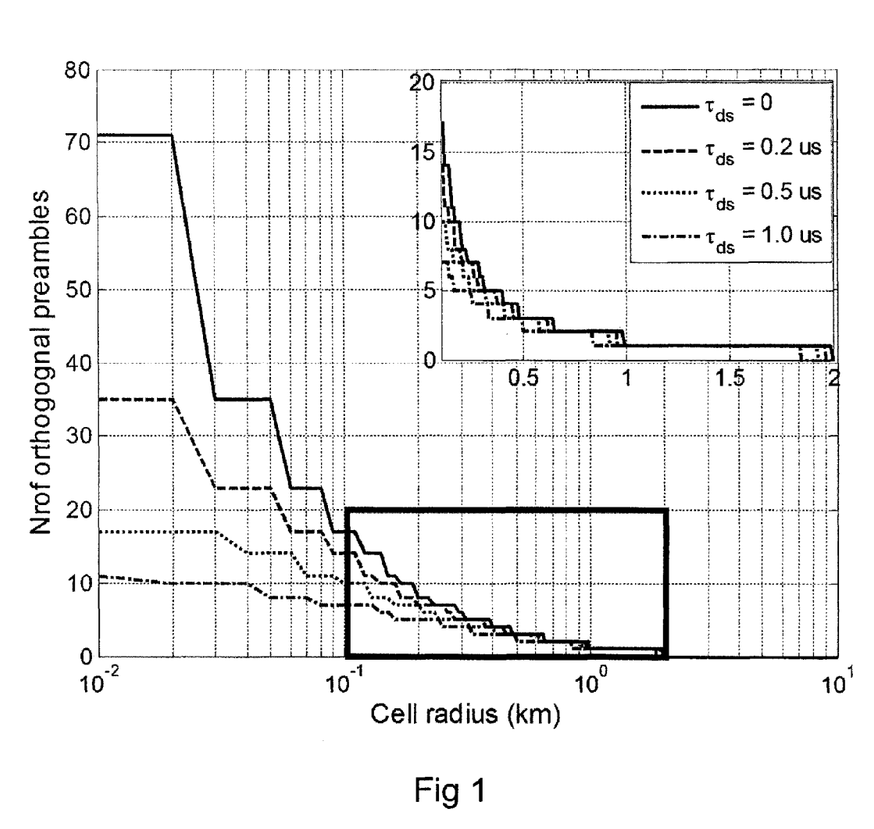
FIG. 1 is a graph showing the relation between the number of available random access preambles and the cell radius for different channel spreads.

In theory, a minimum length of the time domain cyclic shift while still keeping a zero correlation of the ZC root sequences can be obtained by $$N_{cs} \geq \left\lceil \left(\frac{20}{3}r + \tau_{ds}\right)\frac{N_{ZC}}{T_{SEQ}} \right\rceil + n_g,$$

where r is an expected cell radius (km), $\tau_{ds}$ a is a maximum delay spread, $N_{ZC}$ and $T_{SEQ}$ are the sequence length and duration (µs) respectively, and $n_g$ is a number of additional guard samples due to a receiver pulse shaping filter. $N_{ZC}$ may also be referred to as $N_{RAP}$. If using the random access preamble settings, e.g., $N_{ZC}$=71, $T_{SEQ}$=3.3 µs, and further assuming $n_g$=0, the number of available orthogonal random access preambles with different cyclic shifts is plotted in FIG. 1, where different maximum delay spreads of the channel are considered.

In a cell with radius larger than 1 km, no cyclic time shifting can be supported. If the cell radius is about 500 m, there are about 3 cyclic shifts per root sequences that may be supported, which is much smaller than what is supported in LTE which is 209 cyclic shifts (theoretically the number is 209, but from the LTE specification, the largest is 64). Thus, a very small number of orthogonal random access preambles would increase an access collision probability significantly, where the access collision probability may be the probability of two UEs using the same random access preamble at the same time.

As an alternative or complement to the number of random access preambles more physical resources can be reserved for the random access channel to improve capacity in general. However, when deploying a highly flexible downlink and uplink assignment of subframes in each frame, the system could have a small number of uplink subframes for the random access channel. Thus the very small number of available orthogonal random access preambles and UL subframes resources could constrain the random access channel capacity in 5G systems.

Figure 2:
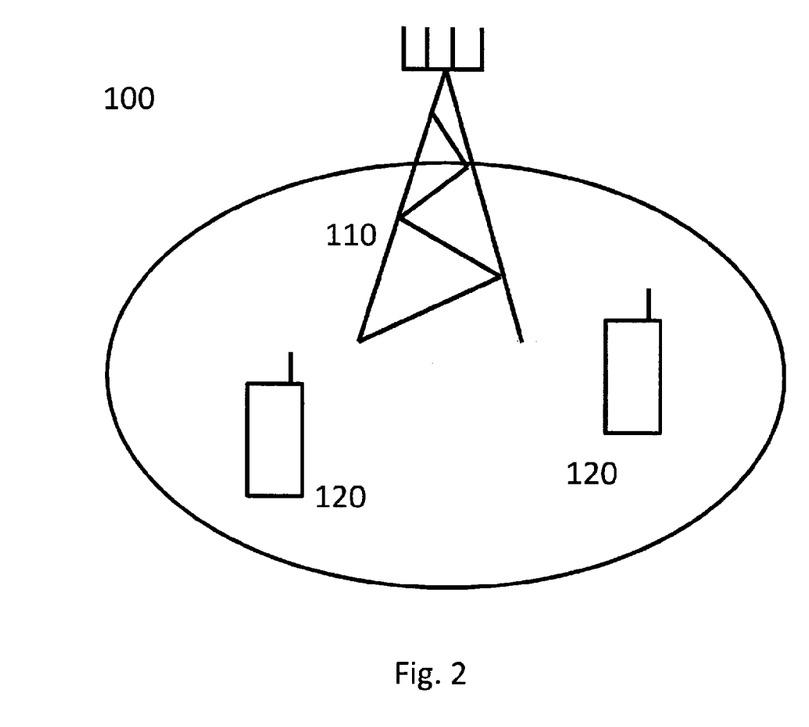
FIG. 2 is a schematic diagram illustrating a wireless network.

FIG. 2 is a schematic diagram illustrating an overall architecture for a wireless network or equivalently a wireless communication system 100 where embodiments presented herein can be applied.

The wireless network too could for example be a 5G system, a LTE system, a Global System for Mobile communications (GSM) system, a High Speed Packet Access (HSPA) system, WiMax, WiFi or the like.

The wireless network too comprises an access node 110. In examples, herein, the access node may be an eNB 110. In other examples, the access node 110 may be a radio network controller (RNC), a base station controller (BSC), a Node B, an access point (AP), a cloud based access node or the like. It is also possible that the access node 110 is a user equipment or any other type of wireless device that can provide wireless access. In addition, the wireless network 100 may comprise one or more nodes 120. In this example the node 120 is in a cell of the access node 110 and the node 120 could request access to the access node 110. The node 120 may be a mobile phone, a cellular phone, a Personal Digital Assistants (PDA) equipped with radio communication capabilities, a smartphone, a laptop equipped with an internal or external mobile broadband modem, portable electronic radio communication devices, wireless tablets, vehicles equipped with radio communication capabilities, household appliances equipped with radio communication capabilities, meters equipped with radio communication capabilities or the like. A cell may correspond to a geographical cell area or a cell in terms of a frequency. In the latter case multiple cells could cover the same geographical area.

The access node 110 as depicted in FIG. 2 may provide data or voice services to the node upon request. The access node 110 may provide these services in a cell. It is also possible that an access node 110 provide services in multiple cells. The access node 110 may further be connected to a second access node, backbone network, the internet or the like to provide these services (not shown).

When a node 120 as depicted in FIG. 2 wants to request access to an access node the node should send a random access preamble according to the following examples.

A random access preamble consists of a root sequence that uniquely can identify the random access preamble.

Using LTE as an example a root sequence may be defined as $$S_u(0) = [s_u(0), s_u(1) \ldots, s_u(N_{ZC}-1)] \quad (1)$$

where $S_u$ is the $u^{th}$ root Zadoff-Chu sequence of length $N_{ZC}$ and $$s_u(n) = e^{-j\frac{\pi m(n+1)}{N_{ZC}}}, 0 \leq n \leq N_{ZC} - 1. \quad (2)$$

To increase the number of random access preambles available in current LTE systems the node 120 randomly selects a cyclic time shift $N_{cs}$. In this exemplary embodiment it is not necessary for the node 120 to select a cyclic time shift of the root sequence, and it can thus be seen as an optional feature. If a cyclic time shift of $N_{cs}$ is used then the sequence will be $$S(N_{cs}) = [s(N_{cs}), s(N_{cs}+1), \ldots, s(N_{ZC}-1), s(0) \ldots, s(N_{cs}-1)]. \quad (3)$$

With an $N_{ZC}$-point DFT, the sequence will be transferred to $$V(N_{cs}) = DFT(S(N_{cs})) = [v_{N_{cs}}(0), \ldots, v_{N_{cs}}(N_{ZC}-1], \quad (4)$$

which will be mapped to the frequency domain. With N sub-carriers reserved for random access, and the starting sub-carrier index or the starting position is m, satisfying mod(m, $N_{sc}$)=0, where $N_{sc}$ is the number of sub-carriers in one RB. Note that mod(m, $N_{sc}$)=0 indicates that the starting position should at the start of each RB. Other starting positions are also possible, i.e. mod(m, $N_{sc}$)≠0, depending on the system configuration.

Before mapping to the frequency domain, the node 120 would select a sub-carrier shift, denoted as $n_{shift}$. In one example $0 \leq n_{shift} \leq N-N_{zc}$, where N is the number of sub-carriers reserved for random access. This will create a linear shift of the random access preamble in frequency. In another example $0 \leq n_{shift} < N_{ZC}$ when the random access preamble is circularly shifted on the sub-carriers reserved for random access. Thus, for a linear shift of the random access preamble in frequency, the signal carried by the $j^{th}$ sub-carrier, r(j), is $$r(m+n_{shift}+i) = v_{N_{cs}}(i), i=0,1,2, \ldots, N_{zc}-1. \quad (5)$$

Since the length of $V(N_{cs})$ is shorter than the number of sub-carriers reserved for random access some sub-carriers would be vacant.

Alternatively, in the case of cyclic sub-carrier shift the signal carried by the $j^{th}$ sub-carrier, r(j), is $$r(\text{mod}(m+n_{shift}+i,N_{ZC})) = v_{N_{cs}}(i), i=0,1,2, \ldots, N_{zc}-1 \quad (6)$$

In yet another alternative, the random access preamble is constructed by a combination of linear and cyclic shifts.

Accordingly, in one exemplary embodiment the linear sub-carrier shift is within an interval of $0 \leq n_{shift} \leq N-N_{RAP}$, wherein $n_{shift}$ is the sub-carrier shift, N is a number of sub-carriers allocated for the random access preamble, and $N_{RAP}$ is a number of values of the random access preamble. $N_{RAP}$ can be used interchangeably with $N_{ZC}$.

In another exemplary embodiment the cyclical sub-carrier shift is within an interval of $0 \leq n_{shift} \leq N_{RAP}$, wherein $n_{shift}$ is the sub-carrier shift and $N_{RAP}$ is a number of values of the random access preamble.

Figure 3:
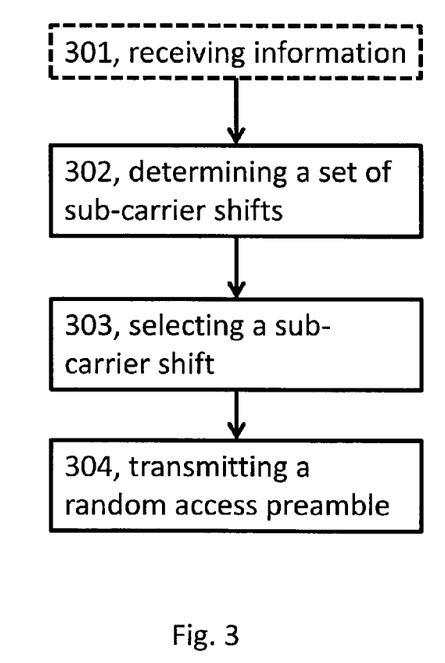
FIG. 3 is a flow chart illustrating an exemplary method in a node.

FIG. 3 shows a flowchart of exemplifying methods performed by the node 120. Note that some actions of the method are optional which is indicated by a dashed line in the figure.

Action 301

The method for the node 120 may comprise receiving information from the access node no for determining the set of sub-carrier shifts. This action is optional.

Different cells, covered by the same or different access nodes no, may have different sub-carrier shifts sets for different detection complexity, different coverage/performance etc. The set of subcarrier shifts could be informed to a node 120 as system control information or access information. If LTE is used the Physical Broadcast Channel (PBCH) could be used for conveying the information to the node 120 as an example is system control information.

From the above descriptions, $n_{shift}$ could be any value in a set of $\varepsilon = \{0, 1, \ldots, N-N_{zc}\}$ or $\varepsilon = \{0, 1, \ldots, N_{ZC}-1\}$ in general, depending on the type of subcarrier shift used.

The set of sub-carrier shifts must be known to the node 120. There are multiple alternatives achieving this for the nod 120. In one example the node 120 is preconfigured with the set of sub-carrier shifts which means that the node 120 does not need to receive any information for determining the set of sub-carrier shifts. In example the access node 110 signals the sub-carrier set to the access node 110. This may be achieved by either signaling the entire set of sub-carrier shifts, and/or signaling the maximum allowed shift and/or all shifts larger than zero and/or any other part of the set. Thus in case of signaling the set, the received information may comprise a maximum sub-carrier shift and/or a value indicating a shift resolution, wherein the shift resolution indicates a spacing between two sub-carrier shifts in the set of sub-carrier shifts.

Another example for the node 120 to known the set of sub-carrier shifts is to specify a shift resolution, which is either received by the node 120 or preconfigured in the node 120. The shift resolution is denoted $n_{sr}$. The shift resolution is advantageously used in order to not use adjacent subcarrier shifts and/or to reduce this signaling required to indicate the set. If the set is defined using a shift resolution this leads to a lower correlation between the different sub-carriers shifts. This means that if two random access preambles are used at the same time by two different nodes 120 these two will have reduce correlation as opposed if two adjacent shifts would have been used. The set with the shift resolution can be defined as $$\varepsilon = \{0, n_{sr}, 2n_{sr}, \ldots, (N_{fs,linear}-1)n_{sr}\}, \quad (7)$$

for a linear sub-carrier shift or $$\varepsilon = \{0, n_{sr}, 2n_{sr}, \ldots, (N_{fs,circular}-1)n_{sr}\} \quad (8)$$

for a cyclic sub-carrier shift where $N_{fs,linear}$ is the maximum number of linear shifted sequences and thus the number random access preambles, which can be supported with N reserved sub-carriers, i.e., $$N_{fs,linear} = \left\lfloor \frac{N - N_{ZC}}{n_{sr}} \right\rfloor$$

and where $N_{fs,cyclic}$ is the maximum number of cyclic shifted sequences, which can be supported, i.e., $$N_{fs,cyclic} = \left\lfloor \frac{N_{ZC}}{n_{sr}} \right\rfloor.$$

The maximum total number of preamble sequences, and thus number of random access preambles, with sub-carrier shifting would be $$N_{linear} = L \times \lfloor N_{zc}/N_{cs} \rfloor \times N_{fs,linear}$$

and $$N_{cyclic} = L \times \lfloor N_{zc}/N_{cs} \rfloor \times N_{fs,cyclic}$$

for linear and cyclic shift respectively, where L is the number of root sequences. For example, with (L=2) two root sequences, a length of the Zadoff-Chu sequence of $N_{ZC}=71$, no time shifted sequences i.e. $N_{cs}=N_{ZC}$, an allocation of N=84, and a resolution of $n_{sr}=10$, then the number of linear shifted sequences equals $$N_{linear} = 2 \times 1 \times 1 = 2$$

and the number of cyclic shifted sequences $$N_{cyclic} = 2 \times 1 \times 7 = 14.$$

Note that these numbers indicate the number of sequences and thus number of random access preambles in addition to the random access preambles which are not sub-carrier shifted.

Action 302

The method for the node 120 comprises determining a set of sub-carrier shifts, wherein each sub-carrier shift indicates a shift with respect to a starting position in frequency domain for transmitting a random access preamble.

If the node 120 has received the set from the access node 120 that received set is used in the determination of the set of sub-carrier shifts. Alternatively, if the set of sub-carrier shifts is not received form the access node 110 it is also possible to pre-configure the node 120 with the set of sub-carrier shifts.

Determining in this context means that the node 120 determines which sub-carrier shifts that will be available to the node 120 when performing random access.

Action 303

Having determined the set of subcarrier shifts the method for the node 120 comprises selecting a sub-carrier shift from the set of sub-carrier shifts. Selecting the sub-carrier shift may comprise selecting the sub-carrier shift randomly or pseudo randomly or by any other means such as a predefined selection process. The action of selecting aims at avoiding two nodes 120 repeatedly selecting the same random access preamble.

The node 120 receiving the information of the set sub-carriers shifts or being preconfigured with the set of sub-carriers shifts may also randomly or pseudo randomly select one random access preamble.

Action 304

When a sub-carrier shift have been selected the method for the node 120 comprises transmitting a random access preamble to an access node 110, wherein the random access preamble is transmitted according to the selected sub-carrier shift.

As described above there are different alternatives of how to shift the random access preamble. One alternative is to linearly sub-carrier shift the random access preamble without cyclically sub-carrier shifting the random access preamble. For example, in the case of 72 sub-carriers reserved for random access and where the length of the random access preamble is 71, the possible sub-carrier shift is one. Otherwise the random access preamble would be shifted outside the sub-carriers reserved for random access. The random access preamble comprises a sequence of values and wherein the sequence of values is linearly sub-carrier shifted according to the selected sub-carrier shift. Alternatively, the sub-carriers are shifted circularly to allow for a larger possible sub-carrier shift. That is, the random access preamble comprises a sequence of values and wherein the sequence of values is cyclically sub-carrier shifted according to the selected sub-carrier shift. In yet another alternative, a combination of linear and cyclic shifts is depending on the number of sub-carriers that are available.

In some embodiments the random access preamble may be transmitted according to the proposed random access as described above in the background section. In these embodiments the random access preamble comprises a sequence of values wherein each value as the same value and has the same length as a data symbol.

In some embodiments the random access preamble is based on a root sequence or a cyclic time shifted root sequence. The root sequence may be a Zadoff-Chu (ZC) sequence or any other sequence suitable for random access. To increase the number of possible random access preambles it is also possible to use a cyclic time shifted version of the root sequence.

Figure 4:
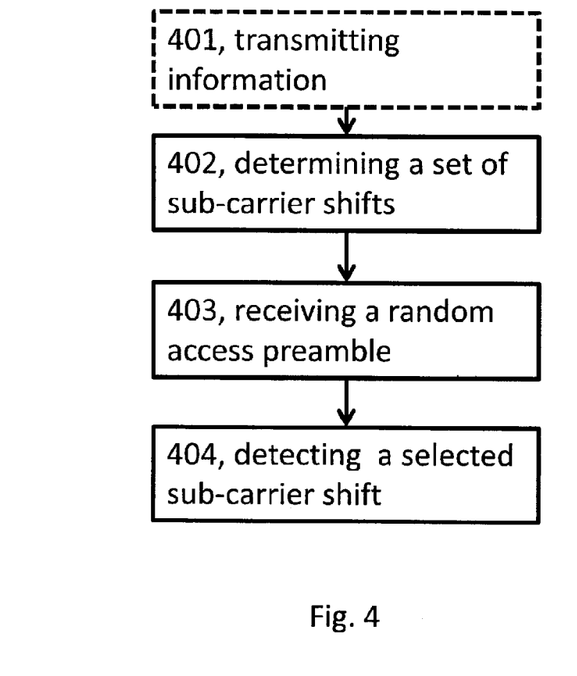
FIG. 4 is a flow chart illustrating an exemplary method in an access node.

FIG. 4 shows a flowchart of exemplifying methods performed for the access node 110.

In the following embodiments of a method for an access node 110 for random access in a wireless network is described Action 401

This action is optional. The method for the access node 110 may comprise transmitting information to the node 120 for determining the set of sub-carrier shifts. This is required if the access node 110 and the node 120 needs to agree on the set of sub-carrier shifts. Alternatively the node 120 is preconfigured with the set of sub-carrier shifts. The transmitted information may comprise a maximum sub-carrier shift and/or a value indicating a shift resolution, wherein the shift resolution indicates a spacing between two sub-carrier shifts in the set of sub-carrier shifts as described in relation to action 301. Other alternatives are possible and which are described in relation to action 301 describing what information that can be received by the node 120 and the same information may also be transmitted by the access node 110.

Action 402

The method for the access node 110 comprises determining a set of sub-carrier shifts, wherein each sub-carrier shift indicates a shift with respect to a starting position in frequency domain for receiving a random access preamble. This applies irrespective of whether the set of sub-carrier shifts is transmitted to the node 120 or not since the access node 110 needs to determine the set of sub-carrier shifts that corresponds to the set of sub-carriers shifts used by the node 120, should the node 120 be preconfigured with the set of sub-carrier shifts.

In one exemplary embodiment the linear sub-carrier shift is within an interval of $0 \leq n_{shift} \leq N - N_{RAP}$, wherein $n_{shift}$ is the sub-carrier shift, N is a number of sub-carriers allocated for the random access preamble, and $N_{RAP}$ is a number of values of the random access preamble. $N_{RAP}$ can be used interchangeably with $N_{ZC}$.

In one exemplary embodiment the cyclic sub-carrier shift is within an interval of $0 \leq n_{shift} \leq N_{RAP}$, wherein $n_{shift}$ is the sub-carrier shift and $N_{RAP}$ is a number of values of the random access preamble.

Note that the set of subcarrier shifts defined above, also applies for the access node 120.

Action 403

Having determined the set of sub-carrier shifts the method for the access node 110 comprises receiving a random access preamble from a node.

The access node 110 is monitoring the sub-carriers reserved for random access in order to detect any new transmission from a node 120. The random access preamble in the frequency domain is then received by extracting sub-carriers corresponding to those sub-carriers used for random access.

Action 404

Having received a random access preamble, the method for the access node 110 comprises detecting a selected sub-carrier shift of the random access preamble out of the set of sub-carrier shifts.

As described above the node 120 may select a sub-carrier shift at random and transmit the random access preamble to the access node 110. Since the selected sub-carrier shift of the random access preamble used by the node 120 is not known to the access node 110, the access node 110 correlates the signal on the sub-carriers for random access with the possible random access preambles. The method for the node 120 may therefore comprise detecting the sub-carrier shift and correlating the random access preamble with the sub-carrier shifts in the set of sub-carrier shifts.

As discussed above the random access preamble may be based on one or more root sequences and one or more cyclic time shifts of the root sequences. That is, the method comprises that the random access preamble is based on a root sequence or a cyclic time shifted root sequence.

The access node therefore correlates with all possible random access preambles for each possible shift. The correlation will depend on whether the random access preamble is linearly sub-carrier shifted or sub-carrier shifted with a cyclic shift. The method may therefore comprise correlating the random access preamble based on that assumption that the random access preamble comprises a sequence of values and wherein the sequence of values are linearly sub-carrier shifted according to the selected sub-carrier shift. Alternatively, the method may therefore comprise correlating the random access preamble based on that assumption that the random access preamble comprises, a sequence of values and wherein the sequence of values are cyclically sub-carrier shifted according to the selected sub-carrier shift.

In some cases all possible random access preambles is limited by the node 120 or the access node 110. The access node 110 would do local correlation on the random access preamble and correlate all candidates in the set of sub-carrier shifts to detect the random access preamble and thus the access request.

In some embodiments the random access preamble may be transmitted according to the above described proposed random access. In these embodiments the random access preamble comprises a sequence of values, wherein each value as a same length as a data symbol. As described above the random access preamble is constructed by repeating a short sequence multiple times and a corresponding random access preamble detector reusing the FFTs for other uplink channels and signals can then be used. Accordingly the length of a value of the sequence may correspond to the length of a data symbol transmitted on another uplink channel. Another uplink channel may for example be the Physical Uplink Shared Channel.

In some embodiments the random access preamble is based on a root sequence or a cyclic time shifted root sequence. The root sequence may be a Zadoff-Chu sequence or any other sequence suitable for random access. To increase the number of possible random access preambles it is also possible to use a cyclic time shifted version of the root sequence.

In the following a node 120 and an access node 110 will be describe in relation to the methods described with respect to FIG. 5 and FIG. 6.

Node 120

A node 120 for random access in a wireless network is disclosed. The node 120 may be configured to implement the method for the node 120 described above. The node 120 comprises means 502, 508 for determining a set of sub-carrier shifts, wherein each sub-carrier shift indicates a shift with respect to a starting position in frequency domain for transmitting a random access preamble. The node 120 further comprises means 502, 509 for selecting a sub-carrier shift from the set of possible sub-carrier shifts. The node 120 further comprises means 501, 510 for transmitting a random access preamble to an access node, wherein the random access preamble is transmitted according to the selected sub-carrier shift.

The different means of the node 120 for performing the embodiments described herein may be realized in the following way.

Figure 5:
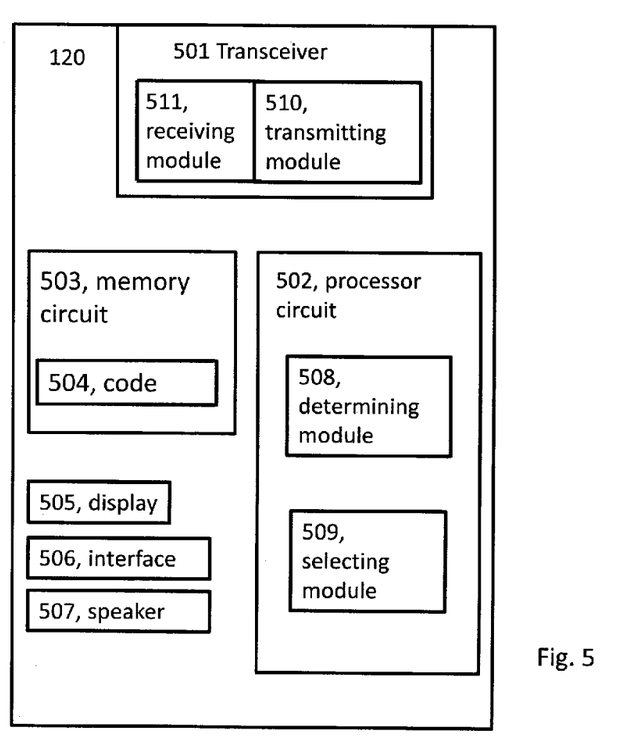
FIG. 5 is a schematic diagram illustrating a node.

FIG. 5 is a block diagram of a node 120, for use in a wireless communications system, which is configured to perform operations according to one or more embodiments disclosed herein. The node 120 includes means such as a transceiver 501, a processor circuit 502, and a memory circuit 503 containing computer readable program code 504. The node 120 may further include means such as a display 505, a user input interface 506, and a speaker 507.

In addition the processor circuit 502 may include means such as a determining module 508 for determining a set of sub-carrier shifts as disclosed herein. The processor circuit 502 may also include means such as a selection module 509 for selecting the sub-carrier shift from the set of sub-carrier shifts. The transceiver 500 may include means such as a transmitting module 510 for transmitting the selected random access preamble.

In addition the processor circuit 502 may be configured to determine a set of sub-carrier shifts as disclosed herein. The processor circuit 502 may also be configured to select the sub-carrier shift from the set of sub-carrier shifts. The transceiver 501 may be configured to transmit the selected random access preamble.

In addition the transceiver 501 may be configured to communicate with an access node 110, through a wireless air interface using one or more of the radio access technologies disclosed herein. The processor circuit 502 may include one or more data processing circuits, such as a general purpose and/or special purpose processor, e.g., microprocessor and/or digital signal processor. The processor circuit 502 is configured to execute the computer readable program code 504 in the memory circuit 503 to perform at least some of the operations described herein as being performed by a node 120.

In addition the node 120 may include means 501, 511 for receiving information from the access node 110 for determining the set of sub-carrier shifts. The transceiver 501 may include means such as a receiving module 511 receiving the information from the access node do for determining the set of sub-carrier shifts. The transceiver 500 may be also be configured to receive information from the access node 110 for determining the set of sub-carrier shifts.

The means for determining, selecting and transmitting may all be adapted to perform any of the actions and/or methods and ore embodiments disclosed here in irrespective of whether it is by configuring any of components of the node 120 and/or by modifying the modules of the node 120.

Access Node 110

An access node 110 for random access in a wireless network is disclosed. The access node 110 may be configured to implement the method for the access node 110 described above. The access node 110 comprises means 602, 608 for determining a set of sub-carrier shifts, wherein each sub-carrier shift indicates a shift with respect to a starting position in frequency domain for receiving a random access preamble. The access node no further comprises means 601, 611 for receiving a random access preamble from a node 120. The access node for detecting a selected sub-carrier shift of the random access preamble out of the set of sub-carrier shifts.

The access node 110 may further comprise means 601, 610 for transmitting information to the node for determining the set of sub-carrier shifts.

The different means of the access node 110 for performing the embodiments described herein may be realized in the following way.

Figure 6:
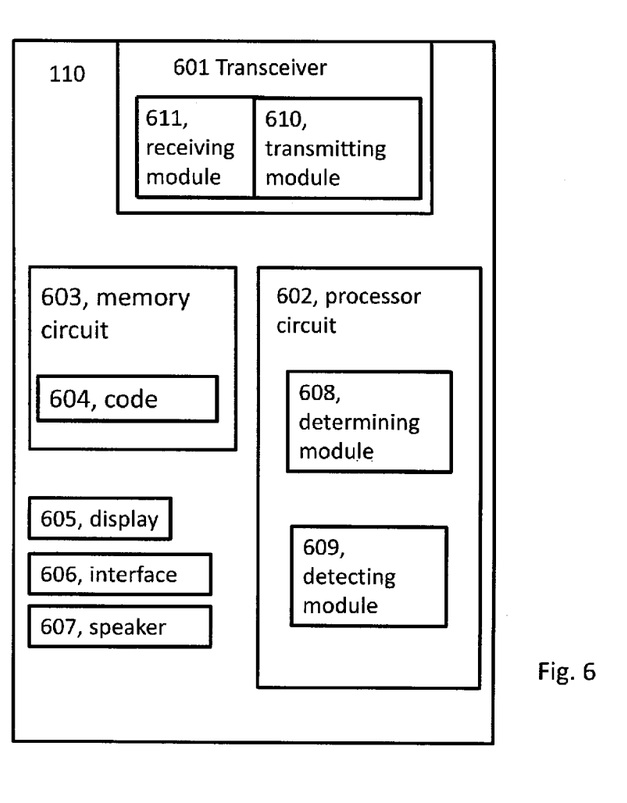
FIG. 6 is a schematic diagram illustrating an access node.

FIG. 6 is a block diagram of an access node 110, for use in a wireless communications system, which is configured to perform operations according to one or more embodiments disclosed herein. The access node 110 includes means such as a transceiver 600, a processor circuit 602, and a memory circuit 603 containing computer readable program code 604. The access node 110 may further include means such as a display 605, a user input interface 606, and a speaker 607.

In addition the processor circuit 602 may include means such as a determining module 608 for determining a set of sub-carrier shifts as disclosed herein. The transceiver 600 may include means such as a receiving module 611 for receiving the selected random access preamble. The processor circuit 602 may also include means such as a detection module 609 for detecting a selected sub-carrier shift of the random access preamble out of the set of sub-carrier shifts.

In addition the processor circuit 602 may be configured to a set of sub-carrier shifts, wherein each sub-carrier shift indicates a shift with respect to a starting position in frequency domain for transmitting a random access preamble as disclosed herein. The transceiver 601 may be configured to receive a random access preamble from a node 120. The processor circuit 602 may also be configured to detect a sub-carrier shift of the random access preamble out of the set of sub-carrier shifts.

In addition the transceiver 601 may be configured to communicate with a node 120, through a wireless air interface using one or more of the radio access technologies disclosed herein. The processor circuit 602 may include one or more data processing circuits, such as a general purpose and/or special purpose processor, e.g., microprocessor and/or digital signal processor. The processor circuit 602 is configured to execute the computer readable program code 604 in the memory circuit 603 to perform at least some of the operations described herein as being performed by an access node 100.

The transceiver 601 may include means such as a transmitting module 610 for transmitting the information to the node 120 for determining the set of sub-carrier shifts. The transceiver 601 may be also configured to transmit the information from to the node 120 for determining the set of sub-carrier shifts.

The means for determining, transmitting and detecting may all be adapted to perform any of the actions and/or methods and/or embodiments disclosed here in irrespective of whether it is by configuring any of components of the access node 110 and/or by modifying the modules of the access node 110.

The implementation of access node 110 and node 120 includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

The transceiver 501, 502, which may also be denoted e.g. Input/Output (I/O) interface, and may include a network interface for sending data to and receiving data from other network nodes. The transceiver 501, 502 may also comprise a receiver but not a transmitter or a transmitter but not a receiver, depending on the circumstances.

| Abbreviation | Explanation |
| --- | --- |
| 5G | Fifth generation |
| UE | User equipment |
| LTE | Long term evolution |
| 3GPP | 3rd Generation Partnership Project |
| DL | Downlink |
| ePDCCH | enhanced Physical Downlink Control Channel |
| BRS | Beam-specific reference signal |
| RS | Reference signal |
| RA | Random Access |
| RE | Resource element |

What is claimed is:

1. A method performed by a wireless device configured for operation in a wireless network, the method comprising:
   generating a random access preamble comprising a set of values, each value being conveyable as a symbol on a respective sub-carrier and the number of values being smaller than the number of sub-carriers in a set of sub-carriers reserved for transmitting random access preambles;
   randomizing the random access preamble with respect to other wireless devices that may be contending for random access to the wireless network by:
      randomly selecting a sub-carrier shift from among a defined set of sub-carrier shifts, each sub-carrier shift defining a different starting position within the reserved set of sub-carriers; and
      mapping respective values from the set of values to respective sub-carriers from the reserved set of sub-carriers according to the selected sub-carrier shift, the respective sub-carriers being referred to as mapped sub-carriers; and
   transmitting the random access preamble via the mapped sub-carriers.

2. The method of claim 1, further comprising further randomizing the random access preamble with respect to the other wireless devices that may be contending for random access to the wireless network by randomly selecting a cyclic sequence shift and generating the random access preamble by applying the selected cyclic sequence shift to a defined root sequence.

3. The method of claim 1, further comprising further randomizing the random access preamble with respect to the other wireless devices that may be contending for random access to the wireless network by randomly selecting a root sequence from among two or more root sequences and generating the random access preamble from the selected root sequence.

4. The method of claim 1, wherein the defined set of sub-carrier shifts comprises a defined set of linear sub-carrier shifts, each linear sub-carrier shift defining a different starting sub-carrier within the reserved set of sub-carriers, and wherein said mapping comprises mapping successive values from the set of values to successive sub-carriers from the reserved set of sub-carriers, beginning with the starting sub-carrier defined by the selected linear sub-carrier shift.

5. The method of claim 4, wherein the number of mapped sub-carriers within the reserved set of sub-carriers equals the number of values in the set of values comprising the random access preamble, and wherein the method comprises leaving the remaining sub-carriers in the reserved set of sub-carriers unused when transmitting the random access preamble.

6. The method of claim 1, wherein the defined set of sub-carrier shifts comprises a defined set of cyclic sub-carrier shifts, each cyclic sub-carrier shift defining a different starting sub-carrier within the reserved set of sub-carriers, and wherein said mapping comprises cyclically mapping the set of values comprising the random access preamble to corresponding subsets of sub-carriers within the reserved set of sub-carriers, said cyclical mapping referenced to the starting sub-carrier defined by the selected cyclic sub-carrier shift.

7. The method of claim 1, further comprising determining the defined set of sub-carrier shifts from information that is pre-configured in the wireless device.

8. The method of claim 1, further comprising determining the defined set of sub-carrier shifts from signaling received from the wireless network.

9. The method of claim 8, wherein the signaling indicates a shift resolution, and wherein determining the defined set of sub-carrier shifts comprises calculating the different starting positions within the reserved set of sub-carriers based on the shift resolution.

10. A method performed by an access node configured for operation in a wireless network, the method comprising:
monitoring specific mappings of sub-carriers within a reserved set of sub-carriers for reception of a known random access preamble, each mapping defined by a corresponding sub-carrier shift in a defined set of sub-carrier shifts that are candidates for random selection by a given wireless device when attempting random access, each sub-carrier shift defining a different starting position within the reserved set of sub-carriers to be used by the given wireless device when mapping values comprising the known random access preamble to respective sub-carriers within the reserved set of sub-carriers; and
initiating a random access procedure responsive to detecting reception of the known random access preamble.

11. The method of claim 10, wherein said monitoring comprises performing correlation processing to detect whether a known sequence of values comprising the known random access preamble is present on any one of the specific mappings of sub-carriers.

12. The method of claim 10, further comprising broadcasting system information from the access node, the system information indicating the defined set of sub-carrier shifts.

13. The method of claim 12, wherein the system information indicating the defined set of sub-carrier shifts indicates a shift resolution that defines the set of sub-carrier shifts.

14. The method of claim 10, further comprising determining the specific mappings based on a set of linear sub-carrier shifts as said defined set of sub-carrier shifts.

15. The method of claim 10, further comprising determining the specific mappings based on a set of cyclic sub-carrier shifts as said defined set of sub-carrier shifts.

16. The method of claim 10, further comprising determining the specific mappings based on combinations of linear sub-carrier shifts and cyclic sub-carrier shifts as said defined set of sub-carrier shifts.

17. The method of claim 10, wherein the known random access preamble comprises one among two or more known random access preambles and said monitoring includes monitoring for any of the two or more known random access preambles, each known random access preamble corresponding to a different cyclic shift as applied to a root sequence and/or corresponding to a different root sequence.

18. A wireless device configured for operation in a wireless network, the wireless device comprising:
a transceiver; and
a processing circuit operatively associated with the transceiver and configured to:
generate a random access preamble comprising a set of values, each value being conveyable as a symbol on a respective sub-carrier and the number of values being smaller than the number of sub-carriers in a set of sub-carriers reserved for transmitting random access preambles;
randomize the random access preamble with respect to other wireless devices that may be contending for random access to the wireless network, based on being configured to:
randomly select a sub-carrier shift from among a defined set of sub-carrier shifts, each sub-carrier shift defining a different starting position within the reserved set of sub-carriers; and
map respective values from the set of values to respective sub-carriers from the reserved set of sub-carriers according to the selected sub-carrier shift, the respective sub-carriers being referred to as mapped sub-carriers; and
transmit, via the transceiver, the random access preamble via the mapped sub-carriers.

19. The wireless device of claim 18, wherein the processing circuit is configured to further randomize the random access preamble with respect to the other wireless devices that may be contending for random access to the wireless network by randomly selecting a cyclic sequence shift and generating the random access preamble by applying the selected cyclic sequence shift to a defined root sequence.

20. The wireless device of claim 18, wherein the processing circuit is configured to further randomize the random access preamble with respect to the other wireless devices that may be contending for random access to the wireless network by randomly selecting a root sequence from among two or more root sequences and generating the random access preamble from the selected root sequence.

21. The wireless device of claim 18, wherein the defined set of sub-carrier shifts comprises a defined set of linear sub-carrier shifts, each linear sub-carrier shift defining a different starting sub-carrier within the reserved set of sub-carriers, and wherein the processing circuit is configured to map successive values from the set of values to successive sub-carriers from the reserved set of sub-carriers, beginning with the starting sub-carrier defined by the selected linear sub-carrier shift.

22. The wireless device of claim 21, wherein the number of mapped sub-carriers within the reserved set of sub-carriers equals the number of values in the set of values comprising the random access preamble, and wherein the processing circuit is configured to leave the remaining sub-carriers in the reserved set of sub-carriers unused when transmitting the random access preamble.

23. The wireless device of claim 18, wherein the defined set of sub-carrier shifts comprises a defined set of cyclic sub-carrier shifts, each cyclic sub-carrier shift defining a different starting sub-carrier within the reserved set of sub-carriers, and wherein the processing circuit is configured to cyclically map the set of values comprising the random access preamble to corresponding subsets of sub-carriers within the reserved set of sub-carriers, said cyclical mapping referenced to the starting sub-carrier defined by the selected cyclic sub-carrier shift.

24. The wireless device of claim 18, wherein the processing circuit is configured to determine the defined set of sub-carrier shifts from information that is pre-configured in the wireless device.

25. The wireless device of claim 18, wherein the processing circuit is configured to determine the defined set of sub-carrier shifts from signaling received from the wireless network.

26. The wireless device of claim 25, wherein the signaling indicates a shift resolution, and wherein the processing circuit is configured to calculate the different starting positions within the reserved set of sub-carriers based on the shift resolution.

27. An access node configured for operation in a wireless network, the access node comprising:
   a transceiver; and
   a processing circuit operatively associated with the transceiver and configured to:
      monitor specific mappings of sub-carriers within a reserved set of sub-carriers for reception of a known random access preamble, each mapping defined by a corresponding sub-carrier shift in a defined set of sub-carrier shifts that are candidates for random selection by a given wireless device when attempting random access, each sub-carrier shift defining a different starting position within the reserved set of sub-carriers to be used by the given wireless device when mapping values comprising the known random access preamble to respective sub-carriers within the reserved set of sub-carriers; and
      initiating a random access procedure responsive to detecting reception of the known random access preamble.

28. The access node of claim 27, wherein the processing circuit is configured to monitor for receipt of the known random access preamble by performing correlation processing to detect whether a known sequence of values comprising the known random access preamble is present on any one of the specific mappings of sub-carriers.

29. The access node of claim 27, wherein the processing circuit is configured to broadcast, via the transceiver, system information from the access node, the system information indicating the defined set of sub-carrier shifts.

30. The access node of claim 29, wherein the system information indicating the defined set of sub-carrier shifts indicates a shift resolution that defines the set of sub-carrier shifts.

31. The access node of claim 27, wherein the processing circuit is configured to determine the specific mappings based on a set of linear sub-carrier shifts as said defined set of sub-carrier shifts.

32. The access node of claim 27, wherein the processing circuit is configured to determine the specific mappings based on a set of cyclic sub-carrier shifts as said defined set of sub-carrier shifts.

33. The access node of claim 27, wherein the processing circuit is configured to determine the specific mappings based on combinations of linear sub-carrier shifts and cyclic sub-carrier shifts as said defined set of sub-carrier shifts.

34. The access node of claim 27, wherein the known random access preamble comprises one among two or more known random access preambles, and wherein the processing circuit is configured to monitor for any of the two or more known random access preambles, each known random access preamble corresponding to a different cyclic shift as applied to a root sequence and/or corresponding to a different root sequence.

* * * * *